United States Patent [19]

Gleasman et al.

[11] Patent Number: 5,186,692
[45] Date of Patent: Feb. 16, 1993

[54] HYDROMECHANICAL ORBITAL TRANSMISSION

[76] Inventors: Vernon E. Gleasman, 11 Pondview Dr., Pittsford, N.Y. 14534; Keith E. Gleasman, 11 McCoord Woods, Fairport, N.Y. 14450

[21] Appl. No.: 768,399
[22] PCT Filed: Mar. 14, 1990
[86] PCT No.: PCT/US90/01407
§ 371 Date: Sep. 12, 1991
§ 102(e) Date: Sep. 12, 1991
[87] PCT Pub. No.: WO90/10807
PCT Pub. Date: Sep. 20, 1990

Related U.S. Application Data

[63] Continuation-in-part of Ser. No. 323,444, Mar. 14, 1989, abandoned.

[51] Int. Cl.5 ............................................. F16H 47/04
[52] U.S. Cl. ...................................... 475/82; 475/72; 475/78; 475/80; 475/340
[58] Field of Search .................. 475/72, 73, 76, 78, 475/80, 81, 82, 83, 84, 339, 340

[56] References Cited

U.S. PATENT DOCUMENTS

| | | | |
|---|---|---|---|
| 2,226,309 | 12/1940 | Gleasman | 192/85 CA |
| 2,780,299 | 2/1957 | Matson | 475/23 X |
| 2,817,250 | 12/1957 | Forster | 475/72 |
| 2,869,397 | 1/1959 | Weaving et al. | 475/72 |
| 2,969,696 | 1/1961 | Fraga | 475/9 |
| 3,114,273 | 12/1963 | Boggs | 475/16 |
| 3,299,741 | 1/1967 | Twiford | 475/102 |
| 3,461,744 | 8/1969 | Booth | 475/23 |
| 3,530,741 | 9/1970 | Charest | 475/6 |
| 3,575,065 | 4/1971 | Kell | 475/6 X |
| 4,327,603 | 5/1982 | Zaunberger et al. | 475/22 |
| 4,382,392 | 5/1983 | Meyerle et al. | 475/81 |
| 4,403,968 | 9/1983 | Heidrich et al. | 74/665 A X |
| 4,434,681 | 3/1984 | Friedrich et al. | 475/82 |
| 4,505,350 | 3/1985 | Stockton | 180/143 |
| 4,563,914 | 1/1986 | Miller | 475/80 |
| 4,625,583 | 12/1986 | Kronogard | 74/661 |
| 4,718,508 | 1/1988 | Tervola | 475/23 X |
| 4,976,666 | 12/1990 | Meyerle | 475/83 |
| 5,011,463 | 4/1991 | Jardrow et al. | 475/78 X |
| 5,052,986 | 10/1991 | Jardrow et al. | 475/72 X |

FOREIGN PATENT DOCUMENTS

| | | |
|---|---|---|
| 0059055 | 1/1982 | European Pat. Off. . |
| 0195452 | 9/1986 | European Pat. Off. . |
| 714061 | 11/1941 | Fed. Rep. of Germany . |
| 3125123 | 1/1983 | Fed. Rep. of Germany . |
| 2387388 | 10/1978 | France . |
| 8902552 | 3/1989 | World Int. Prop. O. ............ 475/80 |

Primary Examiner—Leslie A. Braun
Assistant Examiner—Khoi Q. Ta
Attorney, Agent, or Firm—Eugene Stephens & Associates

[57] ABSTRACT

A continuously variable automotive transmission (10, 30, 110, and 130) uses an orbital drive having an engine input to an orbit shaft (21, 41) orbiting a cluster gear (25, 45) around a control gear (27, 47) and an output gear (26, 46) meshed with the cluster gear on a common axis. Holding the control gear still produces an orbit drive reduction from engine to output; rotating the control gear forward, which can be done with a hydraulic pump (17) and motor (18), diminishes the reduction for higher speed and lower torque; and reversing the control gear reverses the output drive. A pair of clutches (60, 65 and 67, 70) are available for connecting the orbit drive between the engine and the output for a low range and for connecting the engine directly with the output for a direct drive in high range. The transmission is disclosed in four different preferred embodiments, with an underdrive unit which can be used with any of the embodiments to provide a low-low transmission for use in heavy trucks.

29 Claims, 8 Drawing Sheets

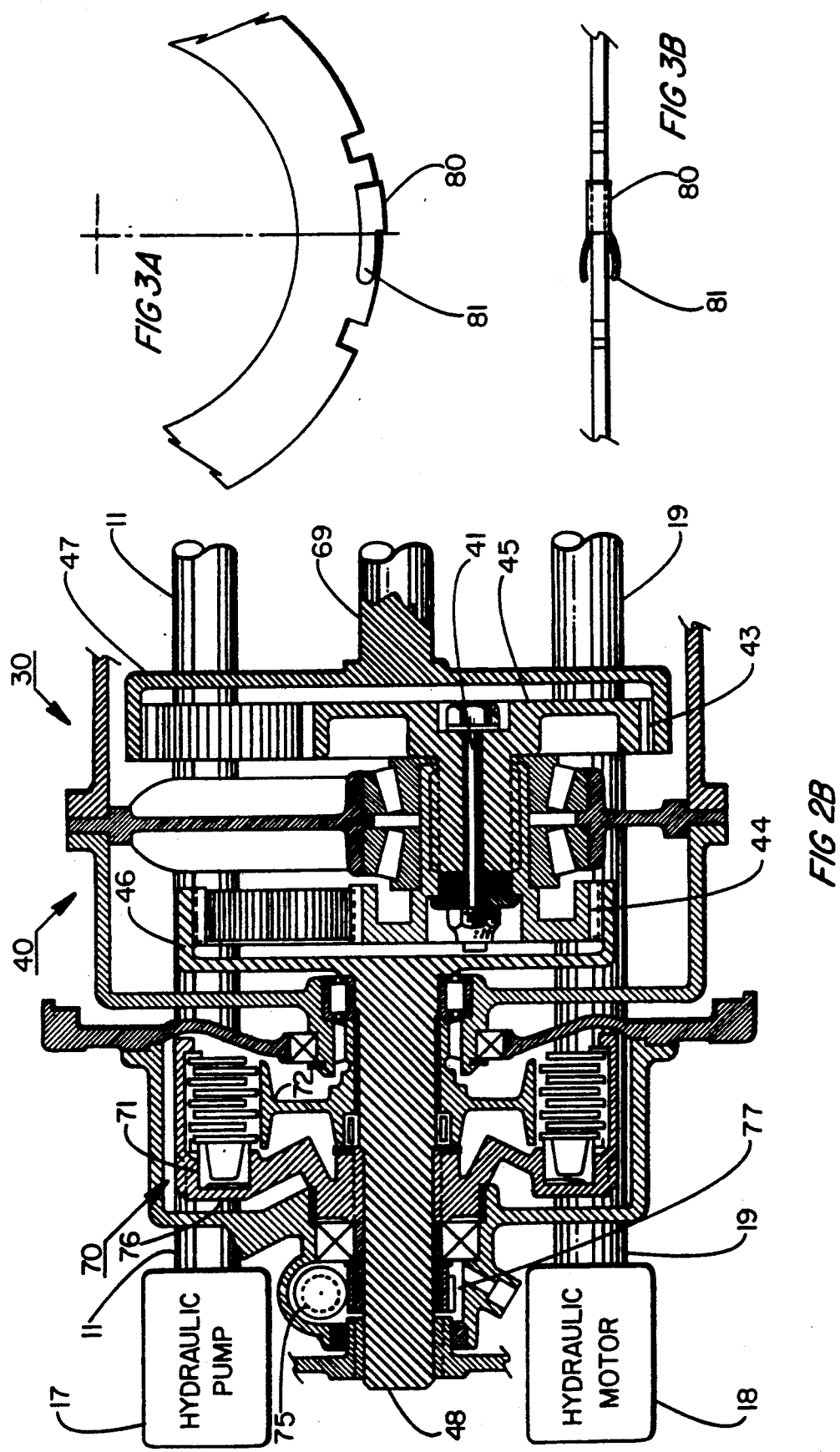

HYDROMECHANICAL ORBITAL TRANSMISSION

This is a continuation-in-part of U.S. Pat. application Ser. No. 07/323,444, filed 14 Mar. 1989, entering the National Stage (EO/US) under 35 U.S.C. 371 as International Application No. PCT/US90/01407, filed 14 Mar. 1990, now abandoned.

TECHNICAL FIELD

This invention relates to automotive transmissions of the automatic type in which the torque and speed ratios of a vehicle drive can be continuously varied from vehicle start-up with its high torque/lower speed conditions through low torque/higher speed conditions of normal highway driving.

BACKGROUND

Automatic transmissions for automobiles are recognized as wasteful and complex, and yet they remain very popular. The inefficiency of the automatic transmission, with its torque converter, makes it a target for improvement, to reduce fuel consumption and emissions.

Automatic transmissions have also changed speed and torque ratios in several shifts that are noticeable when they occur. A continuously variable transmission that smoothly changes torque and speed ratios is also clearly preferable for an automotive transmission.

Orbital-type drives have long been used in transmissions for speed reduction. For instance: U.S. Pat. No. 1,684,162 (Trumpler), an orbiting bevel gear spider is used to obtain a variable range of speed and power regulation for a drive shaft coupled to a machine tool; U.S. Pat. No. 1,984,830 (Higley) discloses a variable speed drive in which a pair of orbital drive transmissions are used to provide independent connections between a constant speed engine and each of the drive wheels of a heavy-duty, slow-moving, self-propelled vehicle; in U.S. Pat. No. 3,298,251 (Moss), a constant-speed output is obtained from a variable speed input by a transmission incorporating an orbital drive controlled by a variable displacement hydraulic pump/motor arrangement; and U.S. Pat. No. 4,856,370 (Stidworthy) shows a transmission which uses an orbital-type drive and operates as a non-slip automotive clutch.

We have devised as improved orbital drive to provide a continuously variable transmission that smoothly changes torque and speed ratios in an efficient automatic automotive transmission. It uses a direct drive for high gear, has no torque converter, and is more efficient than the automatic transmissions that have reached the marketplace. It also continuously varies speed and torque ratios from a low gear up to the direct drive, so that speed and torque ratios are varied smoothly and continuously throughout this range. Our transmission is compact and no more expensive than a conventional automatic transmission, so that it achieves these advantages without costing more, taking up more space, or suffering other disadvantages.

SUMMARY OF THE INVENTION

Our automatic transmission uses an orbital reduction drive connectable between an engine drive and an output, for lower speeds and higher torque; and it allows the engine drive to be connected directly with the output, for a higher speed, lower torque, direct drive. For starting up or climbing hills, where higher torque is needed, the engine drive is applied to the orbit drive to orbit a cluster gear around an output gear and a control gear meshed with the cluster gear and arranged on a common axis. A control input to the control gear establishes and varies a reduction from the engine drive to the output. Holding the control gear still establishes the largest reduction for a low gear drive to the output; rotating the control gear in a forward direction diminishes the reduction as a function of the speed of the control gear, for continuously varying the speed/torque ratio from low gear up to direct drive; and rotating the control gear in a reverse direction reverses the output.

Four preferred embodiments of our automatic transmission are disclosed, along with an additional underdrive unit which can be used with any of the embodiments to provide a low-low transmission for a heavy truck. In the first embodiment, the elements of our transmission are arranged so that its size is very similar to most automotive automatic transmissions presently in use. The second embodiment is similar to the first except that it uses ring gears instead of external gears for the output and control gears. The other two embodiments use external gearing similar to the first embodiment, but in these latter arrangements the entire transmission is considerably shorter than most automatic transmissions in present use. Also, each embodiment has its own individual clutch arrangement; and, of course, our transmission can be arranged in still other configurations which mix and/or match the various elements which appear in each of the disclosed preferred embodiments.

DRAWINGS

FIGS. 3A and 3B are fragmentary views of a spring clip spacer preferably arranged within clutches used in the orbital transmissions of FIGS. 1, 2, and 6.

FIGS. 4A, 4B, and 4C, and 4D are flow charts showing the operation of the transmission in different modes.

Figure 5:
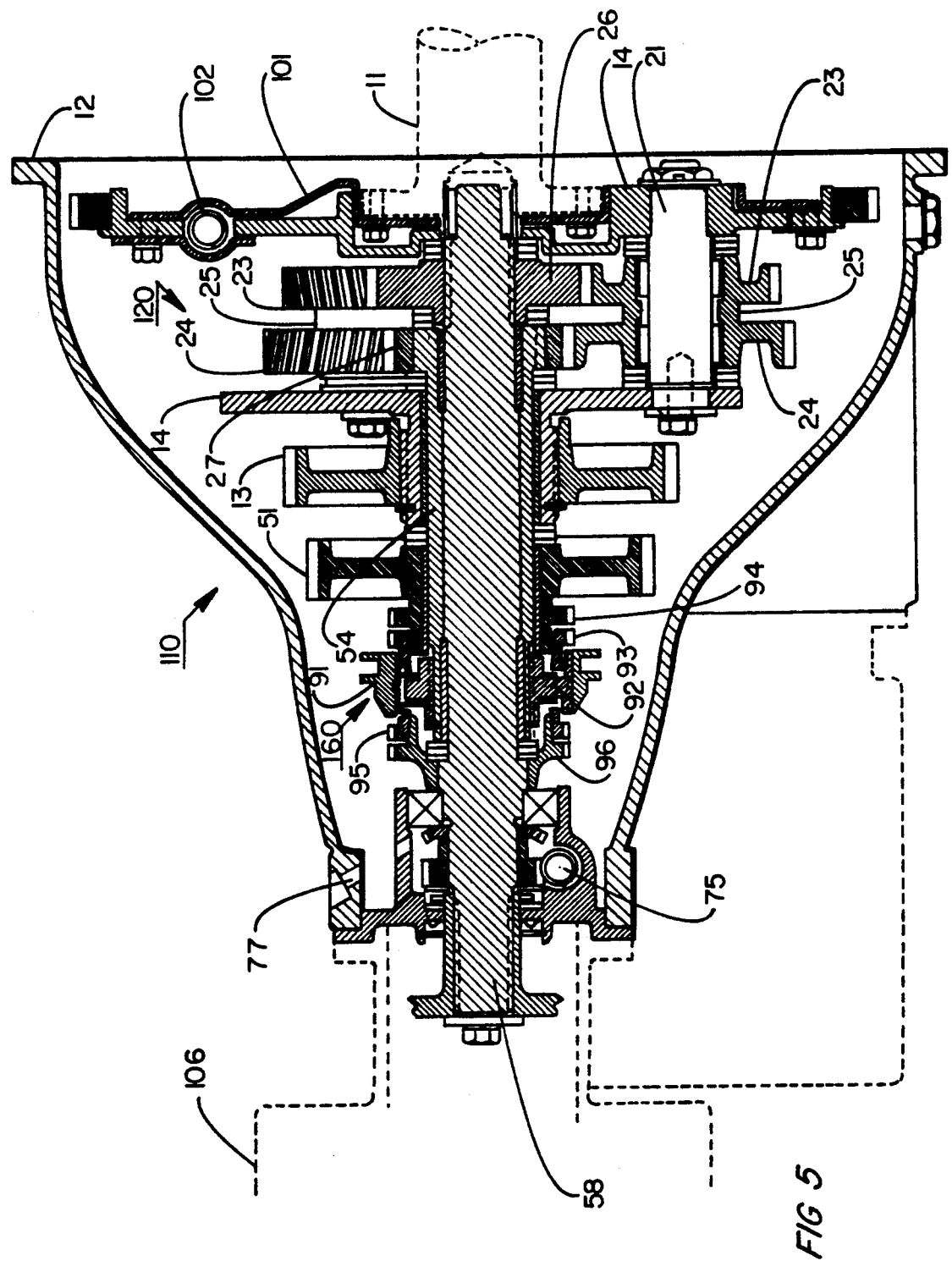

FIG. 5 is a cross-sectional and partially schematic view of a third preferred embodiment of our transmission.

Figure 6:
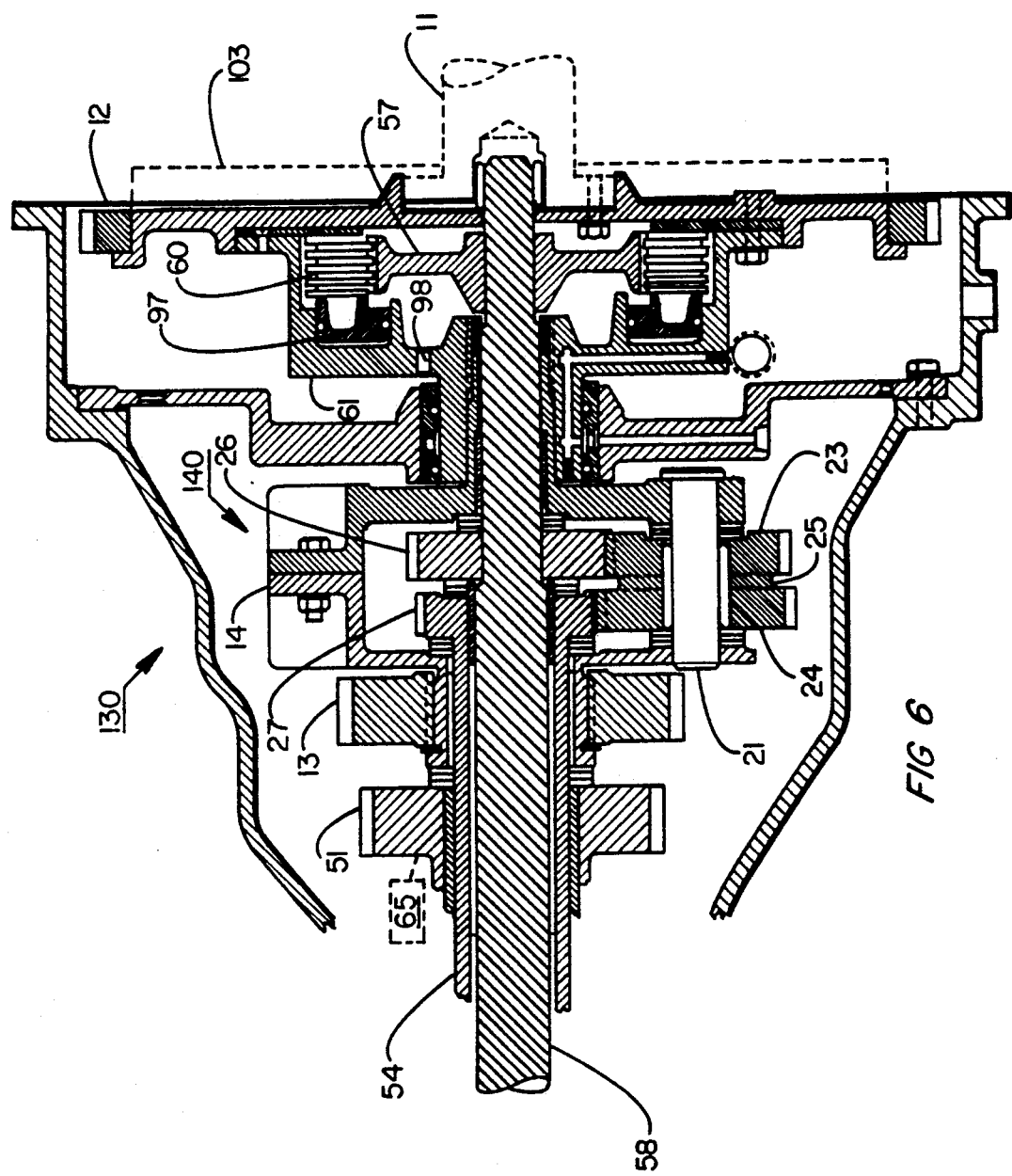

FIG. 6 a cross-sectional and partially schematic view of a fourth preferred embodiment of our orbital transmission.

Figure 7:
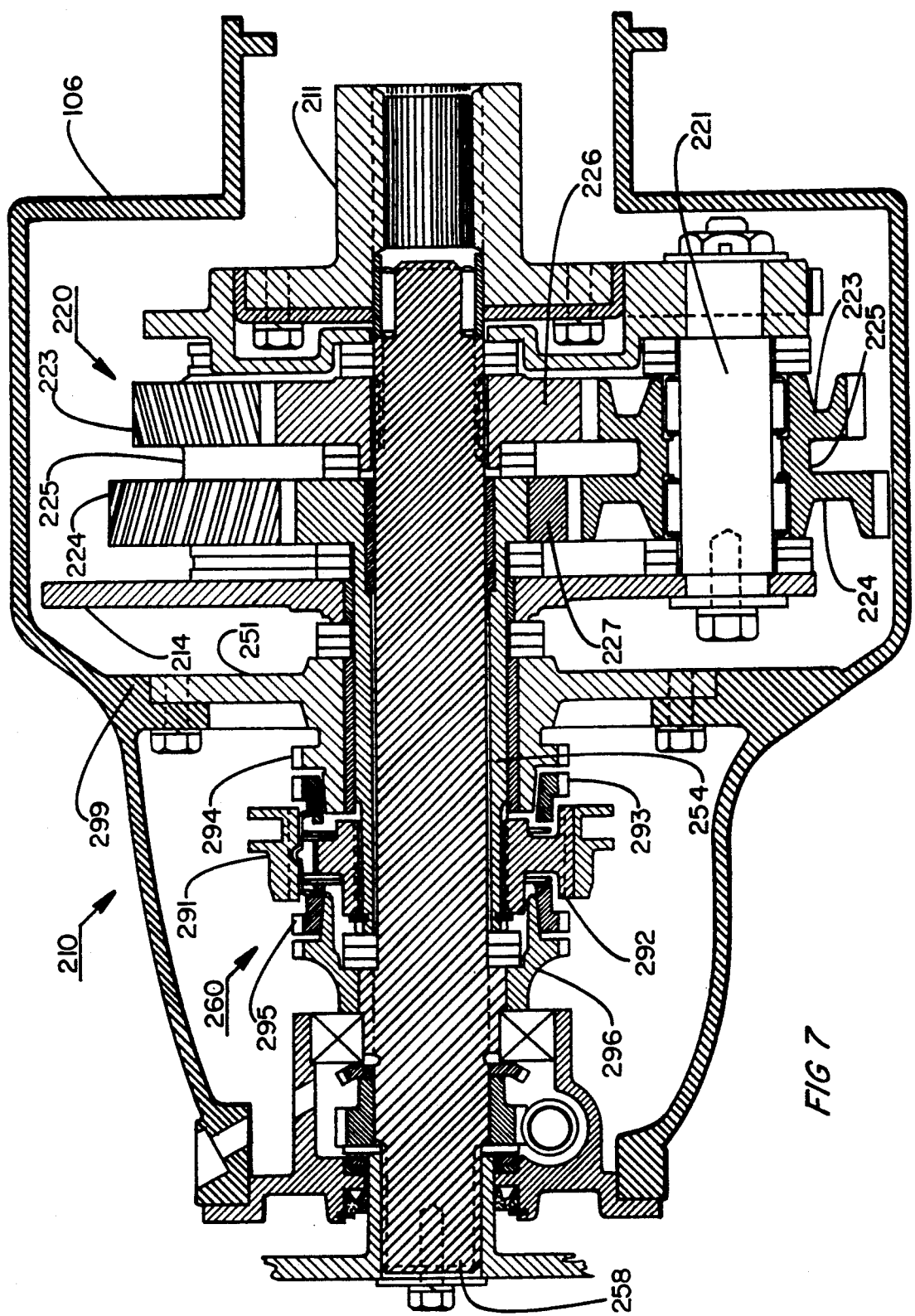

FIG. 7 a cross-sectional and partially schematic view of an underdrive unit which can be used in tandem with any one of the preferred embodiments of our transmission to provide a low-low drive for trucks.

DETAILED DESCRIPTION OF PREFERRED EMBODIMENTS

Orbital Reduction Drive

An orbital reduction drive lies at the heart of our orbital transmission and will be described first. It involves a cluster gear orbiting around an axis of an output gear and a control gear, with teeth meshing between the cluster gear and the output and control gears being numbered to reduce a drive input to the orbiting cluster gear. The reduction occurs and is made variable under control of the control gear and is output through the output gear.

As applied to orbital transmission 10 of FIG. 1, orbital reduction drive 20 includes an orbit shaft 21 orbiting a cluster gear 25 around the common axis of an output gear 26 and a control gear 27. These mesh respectively with the gear teeth 23 and 24 of cluster gear 25, and the radii of the cluster gear teeth matches the radii of the output and control gears so that cluster gear 25 can orbit around and mesh with gears 26 and 27. Varying the tooth numbers of gears 25-27 establishes a reduction from an input on orbit shaft 21 to an output derived from gear 26. This reduction, in a realistically compact transmission, can readily be 10:1, which is much higher than the 2:1 to 3:1 reduction capability of planetary gears. For this reason, we have used an orbital drive rather than a planetary drive in each of our preferred embodiments.

For orbital transmission 10 of FIG. 1, we have selected gear tooth ratios as follows:

| Gear | Number of Teeth |
|---|---|
| Output Gear 26 | 35 |
| Control Gear 27 | 32 |
| Cluster Gear 25: | |
| Gear Teeth 24 | 35 |
| Gear Teeth 23 | 32 |

This produces a reduction of 6.1:1 from input to output, which is adequate for a low gear for an automotive transmission. The amount of the reduction can be made much lower or higher, by selecting different tooth numbers and radii for the gears in orbital drive 20—the illustrated reduction being selected only as one good example. This reduction is achieved by holding control gear 27 against rotation, while orbiting shaft 21 and cluster gear 25. If the gear teeth 24 and 23 on cluster gear 25 were equal in number and output gear 26 and control gear 27 also had equal numbers of teeth, then no reduction would occur; but since the gear tooth numbers do differ, and since gear teeth 23 and 24 rotate together, as elements of cluster gear 25, its orbiting around gears 26 and 27 requires different rotations of these gears and achieves the desired reduction.

In this regard, it should be noted that it is possible to reduce the above described gear reduction even further if helical gears are used in this orbit drive. That is, by designing the mating gear sets with different helix angles, it is possible to have a different number of teeth on gears having the same pitch diameter. For instance, it would be possible to design the gear pairs so that one set of meshing gears would have only one more tooth than the second set and output gear 26 would only move the distance of one tooth pitch for each revolution of orbit shaft 21.

By rotating control gear 27, the reduction achieved by orbit drive 20 can be diminished, and the diminishment can be continuously varied as a function of the speed of rotation of control gear 27. Also, rotating control gear 27 in an opposite direction can reverse the output. These operations will be described below after our orbital transmission is explained.

Orbital reduction drive 40 of orbital transmission 30, as shown in FIG. 2, operates in a similar way, but uses ring gears instead of external gears, for the output and control gears. Orbit shaft 41 carries a cluster gear 45 having external gear teeth 43 and 44 that rotate together as shaft 41 orbits. Output gear 46 and control gear 47 are each ring gears and are on a common axis so that cluster gear teeth 43 and 44 mesh with and orbit around the insides of ring gears 47 and 46 respectively. The gear tooth ratios exemplified in orbital reduction drive 40 are as follows:

| Gear | Number of Teeth |
|---|---|
| Output Gear 46 | 66 |
| Control Gear 47 | 82 |
| Cluster Gear 45: | |
| Gear Teeth 43 | 56 |
| Gear Teeth 44 | 40 |

This produces a reduction drive of 5.125:1 as cluster gear 45 orbits around gears 46 and 47. Again, the maximum reduction is attained by holding control gear 47 against rotation, and this can be diminished by rotating control gear 47.

Orbital Transmission

Referring to transmission 10 of FIG. 1, orbital reduction drive 20 provides higher torque for start-up or hill climbing and is bypassed by a direct drive when lower torque and higher speed are appropriate. This requires a clutched arrangement for shifting between orbital drive and direct drive, and preferred forms of clutches for this are explained below.

Operation of orbital reduction drive 20 requires an input to control gear 27, and we prefer a hydraulic system for this. Pneumatic or electric power inputs to control gear 27 are also possible by substituting analogous pneumatic or electric and electronic components for the hydraulic system that is illustrated.

For transmission 10, engine drive is applied to shaft 11 which rotates with a starter gear 12 replacing the conventional flywheel, which is made possible by the rotating mass of orbital reduction drive 20. A gear 13 and a support 14 for orbit shaft 21 are keyed to engine shaft 11 to rotate at engine speed. A gear 15 meshed with gear 13 turns a pump drive shaft 16 for turning a variable displacement hydraulic pump 17, also at engine speed. Pump 17 in turn drives hydraulic motor 18, which turns a motor shaft 19 sending input to control gear 27.

Since pump 17 is preferably a variable displacement pump, and preferably of the type having a wobble plate, it can be rotated without producing any fluid output and can be tilted or varied to produce a continuously variable fluid output as required. The fluid output from pump 17 turns hydraulic motor 18 and shaft 19 at a speed established by the fluid flow rate, and this is applied to gear 51 via gear 52.

A support 53 for gear 51 is formed as an outer part of a clutch 65 having an inner element 64 keyed to sleeve 54 on which control gear 27 is formed. When clutch 65 is engaged, rotation or non-rotation of hydraulic motor 18 is transmitted to control gear 27 via gears 51 and 52 and sleeve 54.

Output gear 26 is formed on sleeve 56 to which is keyed a support 57 extending around an outer part of a clutch 60 and connected to output shaft 58. This transmits the rotation of output gear 26 around clutch 60 to output shaft 58.

Orbital transmission 10 performs all of the operations necessary for an automatic transmission in an automobile. Beginning with a stopped vehicle and an idling engine, both clutches 60 and 65 are disengaged, which holds output shaft 58 motionless while engine shaft 11 rotates, turning orbit shaft 21 and pump gear 13. Since no movement is called for, hydraulic pump 17 does not pump and hydraulic motor 18 holds gear 51 motionless. Since output gear 26 does not rotate, control gear 27 rotates slowly in a reverse direction as cluster gear 25 orbits. This motion of control gear 27 is lost in disengaged clutch 65, so that the vehicle does not move. This condition is indicated in the flow chart illustrated in FIG. 4A.

When the driver touches the accelerator, calling for forward movement, clutch 65 engages so that input from hydraulic motor 18 transmits to control gear 27. This initially holds control gear 27 against rotation, because hydraulic pump 17 is not yet pumping and fluid lines to hydraulic motor 18 are closed against flow. This holding of control gear 27 against rotation does not require any power from the hydraulic system, and it establishes the maximum reduction of 6.1 from engine shaft 11 to output shaft 58, as the vehicle begins moving forward in low gear (see flow chart in FIG. 4B).

It should be noted that, in our preferred embodiments, the control input to gear 27 is provided by a hydraulic system which does not include any pressure check valve as is normally used in "hydrostatic" pump-/motor systems. Therefore, when using our hydraulic system to hold control gear 27 against rotation, high static pressure can build up in hydraulic motor 18. However, our hydraulic system is specially designed so that pump 17 and motor 18 can be mounted in such close proximity that they can be contained with a common housing and connected by an opening within the shared housing rather than by flexible hydraulic lines. Therefore, in actual practice, our hydraulic system is readily able to withstand intermittent buildups of pressures more than six times the constant-duty p.s.i. ratings of the units. Of course, should such pressure buildups be deemed undesirable for any reason, it would be possible to use a mechanical brake (not shown) to prevent the rotation of gear 51, sleeve 54, and control gear 27. This would be accompanied by an arrangement for bleeding the pressure from motor 18 during this locked condition or, preferably, an arrangement in which excessive increases in pressure within the hydraulic system would be applied to a piston actuating the mechanical brake.

After the engine and vehicle speeds increase sufficiently, then the gear reduction is diminished so that less torque and more speed can be transmitted to output shaft 58. This is done by tilting a wobble plate or otherwise adjusting hydraulic pump 17 to begin pumping fluid to hydraulic motor 18. This begins rotating control gear 27 in a forward direction at a speed that can gradually increase and that is continuously variable throughout a range (see flow chart in FIG. 4C). Slow rotation of control gear 27 requires little horsepower and diminishes the reduction drive by a small amount, and faster rotation of control gear 27 requires more horsepower and diminishes the reduction drive by a larger amount. This is accomplished by gradually increasing the flow rate of hydraulic pump 17 for gradually speeding up the rotation of hydraulic motor 18. At the lower engine speeds occurring during start-up, the power required for the hydraulic system to turn control gear 27 is reasonably small, of short duration, and well within the capacity of a compact pump and motor.

When hydraulic pump 17 is pumping at full capacity, to turn hydraulic motor 18 at the fastest speed possible relative to engine shaft 11, control gear 27 is rotated rapidly enough to fully diminish the reduction so that output gear 26 rotates at the same speed as engine shaft 11. This allows clutch 60 to be engaged and clutch 65 to be disengaged for bypassing orbital reduction drive 20 and shifting to a direct drive from engine shaft 11 to output shaft 58. This occurs because an inner clutch element 61 is keyed to engine shaft 11 and transmits rotation through engaged clutch 60 to outer clutch element 57 connected to drive shaft 58. The rotational speed and torque of engine shaft 11 then pass directly through clutch 60 to output shaft 58 for a highly efficient drive whose only losses are bearing and gear friction (see flow chart in FIG. 4D). Shifting to the direct drive range, where the vehicle spends most of its driving time, occurs at a low enough engine speed so that the power demands on hydraulic pump 17 and motor 18, operating at full engine speed, are still modest. Maximum horsepower occurs at higher speeds in the direct drive range, where orbital reduction drive 20 is bypassed and idling. Once bypassed, orbit shaft 21 and cluster gear 25 continue to orbit around gears 26 and 27; but no output occurs from this, because of the disengagement of clutch 65.

If the vehicle begins climbing a hill and requires higher torque, downshifting into orbital reduction drive is possible. First, hydraulic pump 17 is set to pump at its full rate to turn hydraulic motor 18 at full speed relative to engine shaft 11. Because of the gear connections from engine shaft 11 to the hydraulic system and back to control gear 27, control gear 27 rotates at a speed that turns output gear 26 at the same speed as engine shaft 11. Then clutches 60 and 65 can be switched so that clutch 60 is disengaged and clutch 65 is engaged to place orbital reduction drive 20 in the power train. Then reducing the pumping speed of pump 17 slows the rotation of control gear 27, producing a geared reduction from engine shaft 11 to output shaft 58. This reduction can go as far as the full reduction of low gear, if necessary, or can be a partial or mid-range reduction suitable for climbing a hill on a highway. Once the hill is climbed, pump 17 and motor 18 can be speeded up to match the speed of output gear 26 with the speed of engine shaft 11 so that clutches 60 and 65 can shift back to direct drive.

According to the description just given above, when pump 17 is pumping at its full capacity, hydraulic motor 18 drives control gear 27 so that output gear 26 rotates at the same speed as engine shaft 11. However, it has been noted in actual practice that the engagement of clutch 60 may be facilitated if, when hydraulic pump 17 is pumping at full capacity, output gear 26 rotates at a speed which is slightly faster than engine shaft 11. Therefore, in this regard, the statement that output speed matches, or is substantially equivalent to, engine speed is intended to include such slightly faster output speed. It will be readily understood by those skilled in the art that such proportioning of the speed of output gear 26 relative to engine shaft 11 is determined by appropriate selection of the gearing interconnecting the hydraulic pump/motor arrangement.

To back up the vehicle, the driver shifts orbital transmission 10 to reverse, which changes the direction of hydraulic pump 17 so that hydraulic motor 18 reverses control gear 27. This causes output gear 26 to reverse output shaft 58 in response to orbiting of cluster gear 25 by engine shaft 11.

The direct drive from engine shaft 11 to output shaft 58 includes the possibility of an overdrive or underdrive. Both of these are available in the automotive market and can be coupled into drive shaft 58, if desired, depending on the speed and torque requirements for each particular vehicle. A novel form of underdrive, specifically designed to operate with our transmission, is disclosed below. The expression "direct drive" is intended to cover use of an overdrive or underdrive.

Figure 2A:
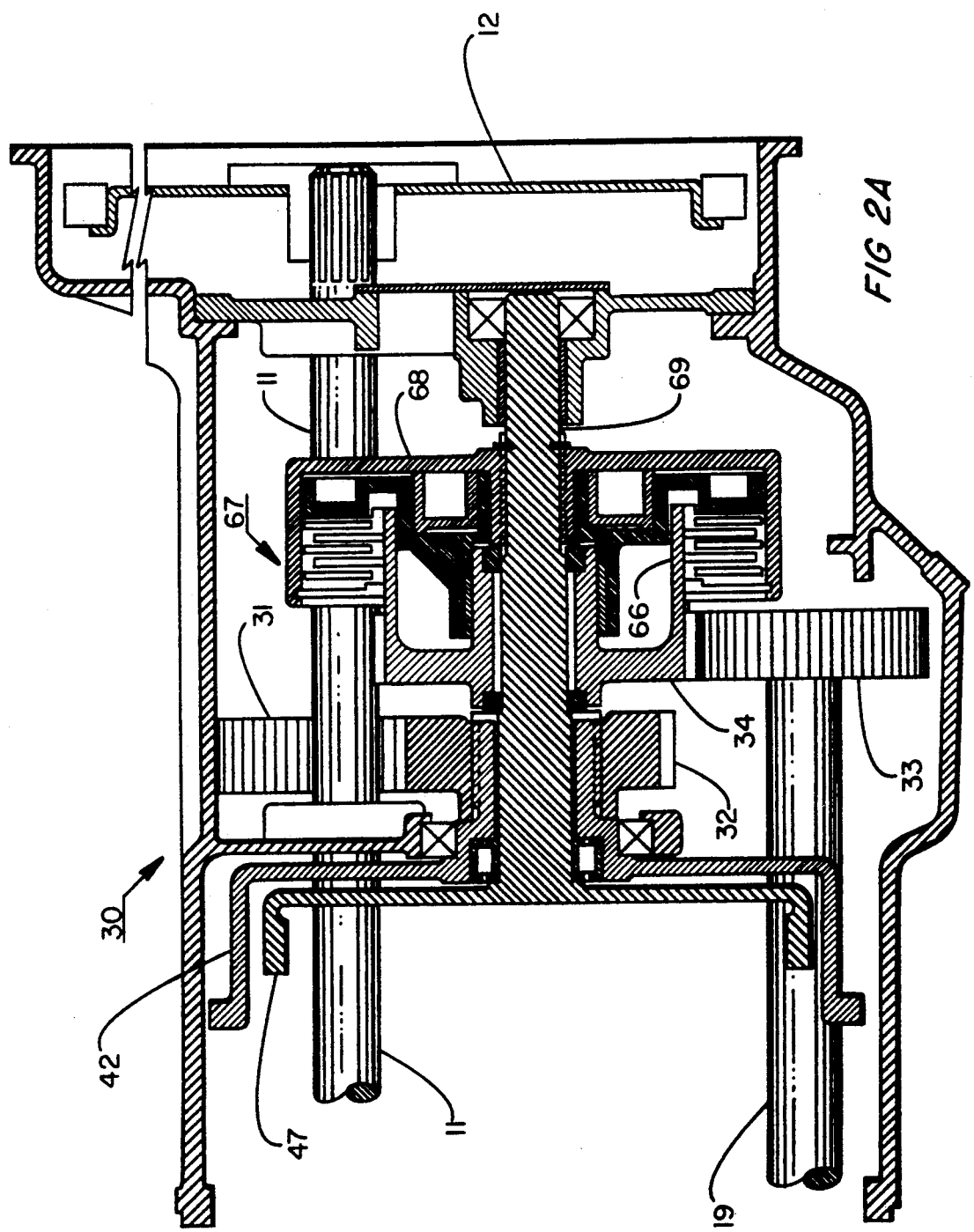
FIG. 2 is a cross-sectional and partially schematic view of a second preferred embodiment of our orbital transmission, divided into FIGS. 2A and 2B.
Figure 4D:
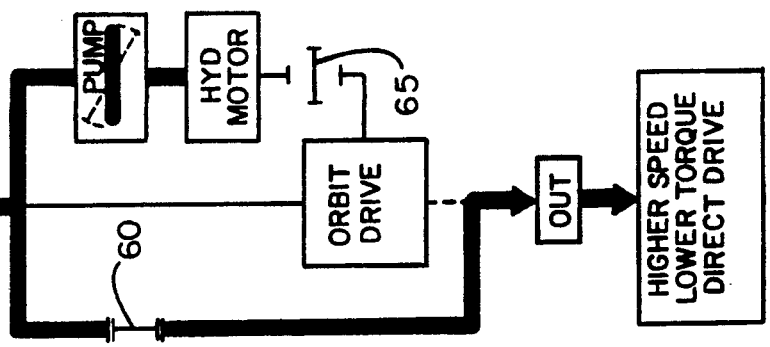
Figure 4C:
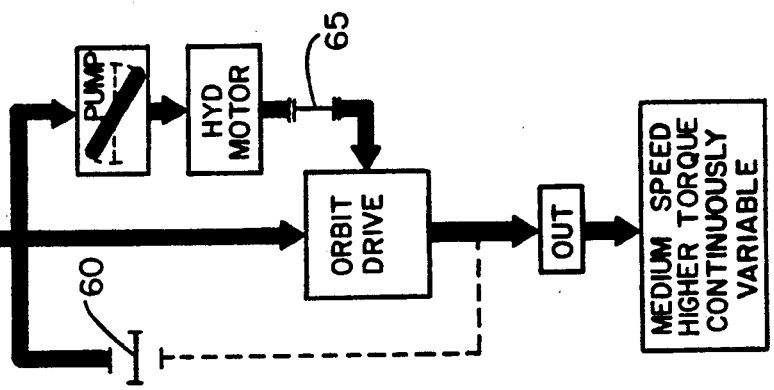
Figure 4B:
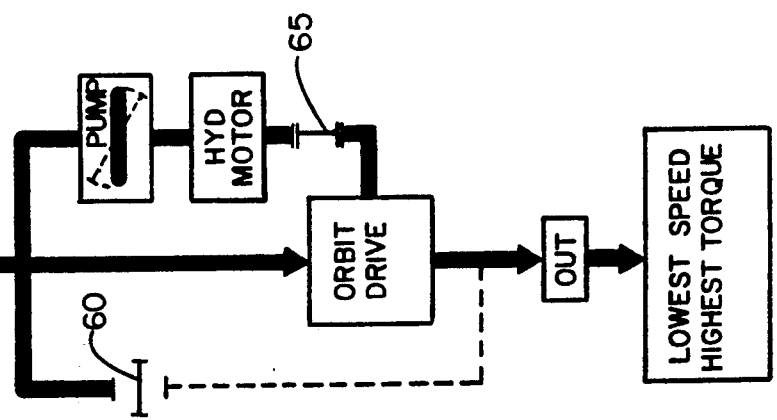
Figure 4A:
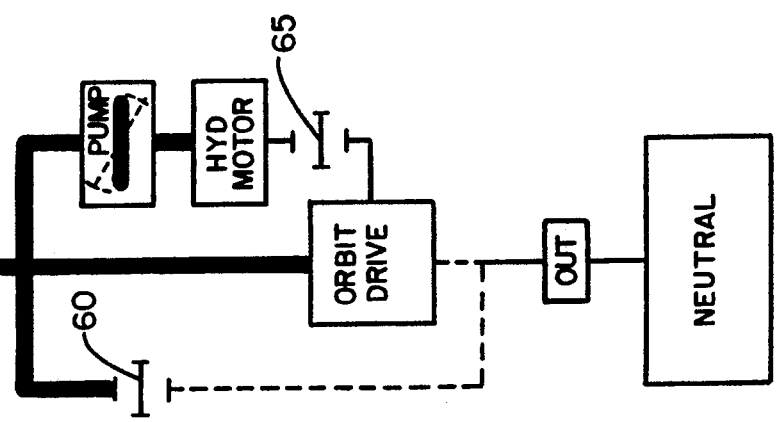

Referring now to the embodiment illustrated in FIGS. 2A and 2B, orbital transmission 30 operates in a similar way but differs somewhat in structure. Because cluster gear 45 orbits around the inside of ring gears 46 and 47, it is not possible to extend an engine shaft through the orbit drive, as is done in transmission 10. So engine shaft 11 of transmission 30 is offset from the axis of ring gears 46 and 47 in orbital reduction drive 40, and engine shaft 11 extends directly to hydraulic pump 17. A gear 31 on engine shaft 11 turns an idler gear (not shown) that rotates a gear 32 that is keyed to a housing 42 of orbital drive 40, so that gear 32 rotates orbit shaft 41 and cluster gear 45.

Control input to control gear 47 from hydraulic motor 18 and shaft 19 is applied via gear 33 to a gear 34 connected to the inner part 66 of clutch 67, having an outer part 68 keyed to control shaft 69 on which control gear 47 is mounted. When clutch 67 is engaged, rotation or non-rotation of hydraulic motor shaft 19 is transmitted through clutch 67 to shaft 69 and control gear 47.

Output gear 46 is mounted on output shaft 48, and the outer part 71 of clutch 70 is keyed to output shaft 48. The inner part 72 of clutch 70 is arranged on housing 42 of orbital reduction drive 40, to rotate with engine input to gear 32. When clutch 70 is engaged and clutch 67 is disengaged, a direct drive from engine shaft 11 turning gear 32 and housing 42 is transmitted through clutch 70 to output shaft 48.

Figure 1A:
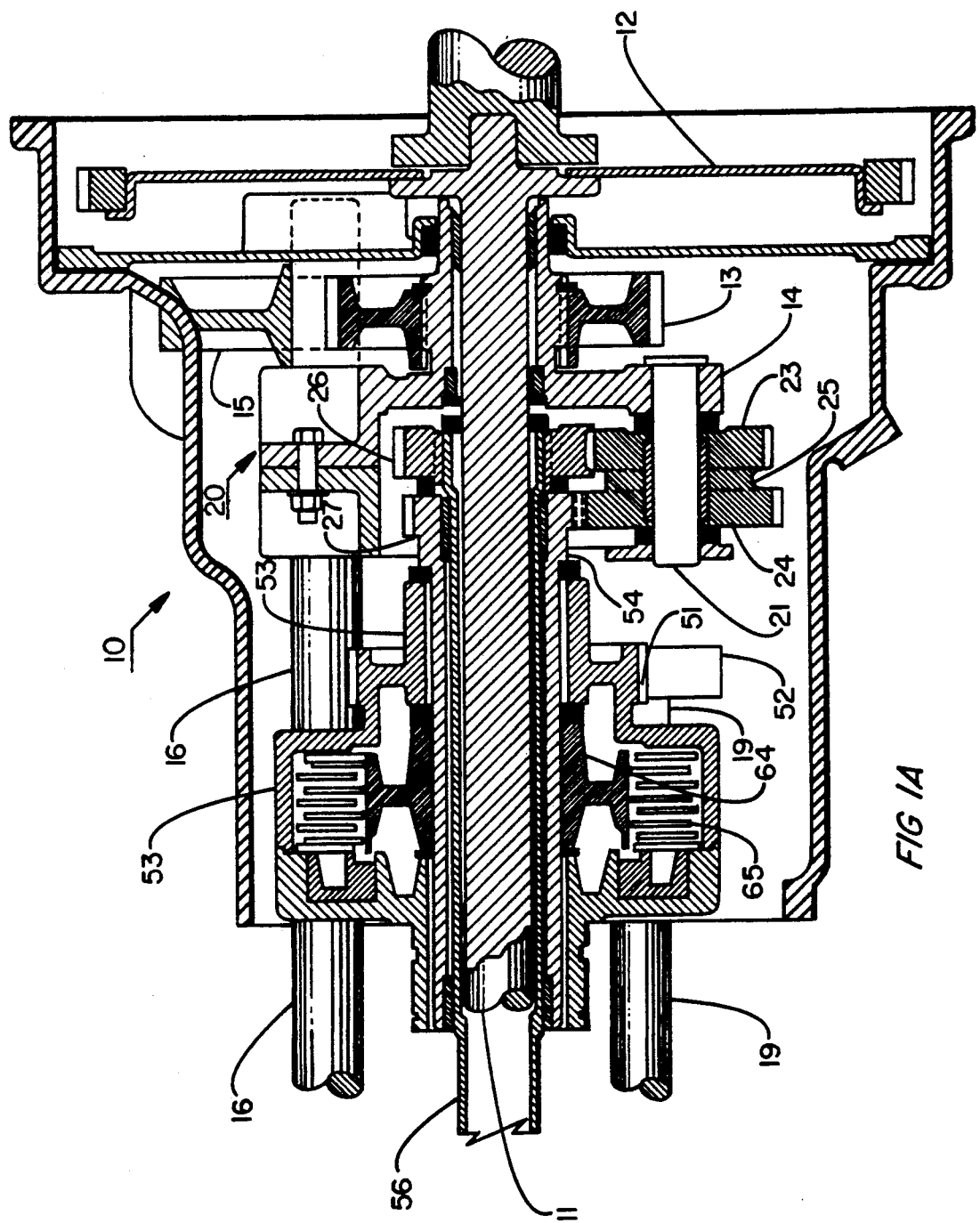
FIG. 1 is a cross-sectional and partially schematic view of a first preferred of our orbital transmission, divided into FIGS. 1A and 1B.
Figure 1B:
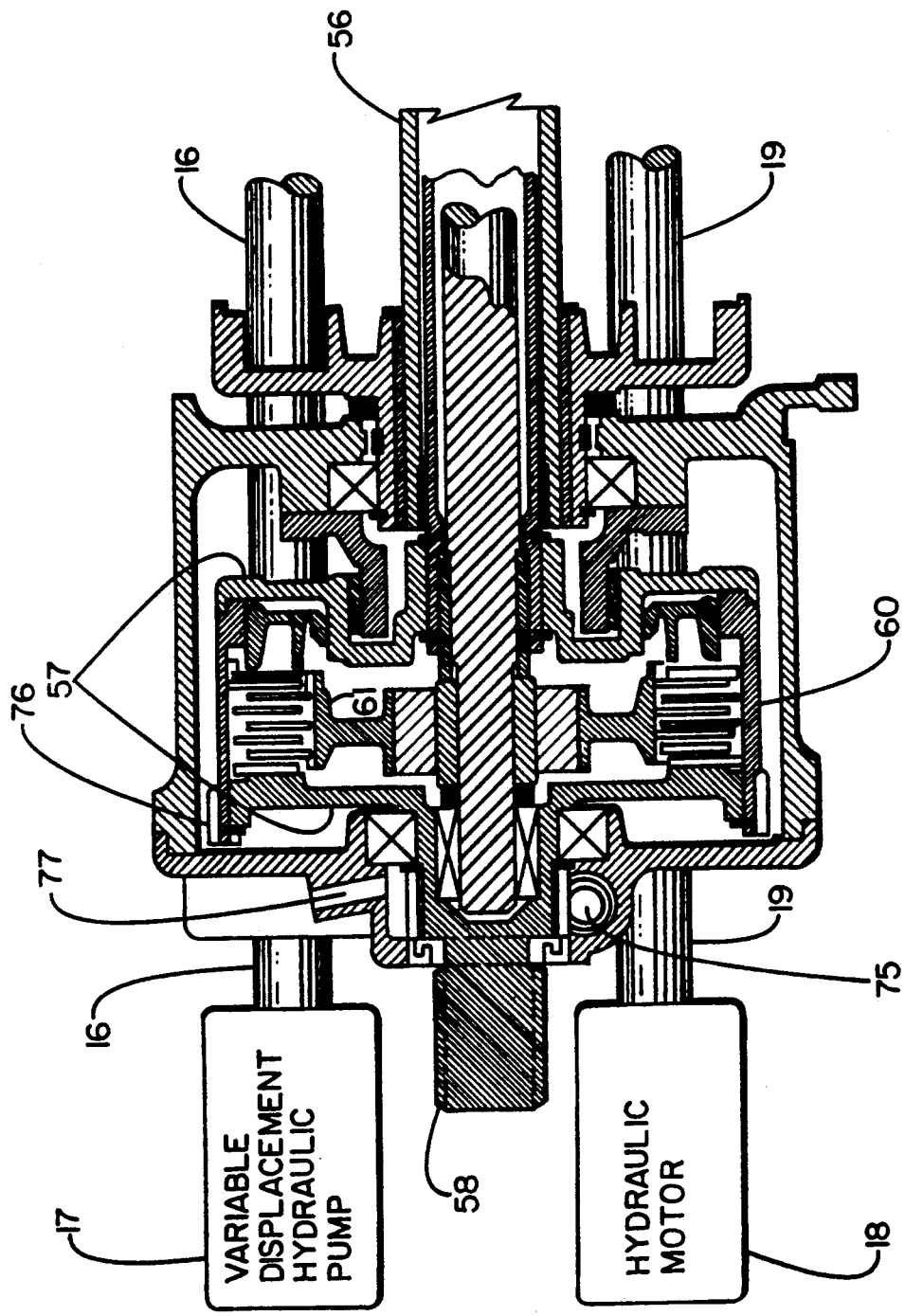

Referring now to the third preferred embodiment illustrated in FIG. 5, orbital transmission 110 uses external gears similar to those used in the first embodiment disclosed above (transmission 10 in FIG. 1A); and to facilitate the explanation of this third preferred embodiment, the same reference numerals are used to identify elements in this arrangement which have the same function as similar elements described earlier in relation to the embodiment illustrated in FIGS. 1A and 1B.

Again, the engine shaft 11 is directly connected with both starter gear 12 and a support 14 which carries orbit shaft 21. Also keyed to turn with engine shaft 11 is gear 13 which drives the variable displacement hydraulic pump. While the hydraulic control input system (comprising pump 17 and motor 18) have been omitted from FIG. 5, they operate in exactly the same manner with this embodiment as was explained in reference to transmission 10, namely, with gear 51 being driven by motor 18. Similarly, cluster gear 25 is mounted on orbiting shaft 1 and its gear teeth 24 and 23 mesh, respectively, with control gear 27 and output gear 26; and orbit drive 120 operates in the same manner as orbit drive 20 in the first embodiment described above.

It should be noted that orbital transmission 110 is considerably shorter than conventionally-sized transmission 10 (illustrated in FIGS. 1A and 1B), transmission 110 being only a little more than one-half the length of transmission 10. This shorter length is achieved in part by the consolidation of the clutches into a single synchronous clutch arrangement 160. The clutch is illustrated with its sliding collar 91 in a neutral position.

Sliding collar 91 rides on a synchronizer hub 92 which is keyed to sleeve 54 which, in turn, is keyed to control gear 27. Sliding collar 91 is movable to both the left and the right as viewed in FIG. 5. When moved to the right, it initially engages a first blocking ring 93 and, thereafter, a second set of gear teeth 94 which are also fixed to rotate with drive gear 51. When shifted into this right hand position, sliding collar 91 engages drive gear 51 with collar 54 and control gear 27. In this condition, synchronous clutch 160 serves the same function as clutch 65 in FIG. 1A, namely, permitting the hydraulic pump and motor arrangement to control the rotation of control gear 27. Synchronous clutch 160 is engaged in this right hand position during low speed, high torque operation and until output gear 26 is brought up to a speed matching that of crankshaft 11 in the manner explained above.

Synchronous clutch 160 also carries out the same function as clutch 60 in FIG. 1B. This occurs when sliding collar 91 is moved from its neutral position, as illustrated, to the left, initially engaging a second blocking ring 95 and, thereafter, the teeth of pinion 96 which is keyed to output shaft 58. When sliding collar 91 is in this left hand position, synchronous clutch 160 locks control gear 27 and output gear 26 together so that there is no longer any relative motion between them. This prevents any further relative rotation between orbiting cluster gear 25 and output shaft 58, and thus directly couples the rotation of crankshaft 11 with output shaft 58.

Orbital transmission 110 functions in the same manner as was explained in regard to the operation of orbital transmission 10, and its synchronous clutch 160 operates in the same manner as the well-known Warner gear synchronizers manufactured by the Warner Gear Division of Borg-Warner Corporation. Also, as indicated above, a supplemental overdrive or underdrive unit can be connected to output shaft 58. (The casing 106 of such a supplemental unit is represented schematically.)

A fourth embodiment of our invention is shown as orbital transmission 130 in FIG. 6. The various elements of this arrangement also operate in the same manner as those described in relation to orbital transmissions 10 and 110 and so, to facilitate the explanation and understanding of this further embodiment, similar functioning elements have once again been given the same reference numerals.

In this fourth embodiment, engine crankshaft 11 is again directly connected with pump drive gear 13 and orbital drive support 14, and it is also directly connected with clutch support element 61. Orbiting drive 140 carries orbit shaft 21 upon which is mounted cluster gear 25. Gear teeth 24 and 23 of cluster gear 25 mesh, respectively, with control gear 27 and output gear 26. While the variable displacement hydraulic pump and hydraulic motor are not shown, the rotation of control gear 27 is regulated in the same manner as in the previous embodiments, namely, when drive gear 51 is engaged with sleeve 54 by clutch 65 (indicated schematically), the rotation of control gear 27 is regulated by the hydraulic pump and motor to provide the continuously variable drive during low speed, high torque operation. (NOTE: The variable displacement hydraulic pump 17 and motor 18 are not shown in FIG. 6, but it should be understood that they are connected, respectively, with pump drive gear 13 and drive gear 51 in the same manner as described above in regard to the first embodiment of the invention illustrated in FIGS. 1A and 1B.)

Similarly, when the variable displacement pump is operating at full capacity to bring output gear 26 up to the same rotational speed as engine shaft 11, transmission 130 is shifted into direct drive by the actuation of clutch 60 which engages the sets of plates connected, respectively, with supports 57 and 61. As indicated above, support 61 is fixed to rotate with crankshaft 11, and support 57 is keyed to output shaft 58. When clutch 60 is activated to establish this direct drive, clutch 65 is simultaneously disengaged, resulting in the bypassing of the orbital reduction drive 140 in the same manner as was described in relation to orbital drive 20 (FIGS. 1A and 1B).

Clutch 60 is actuated by a hydraulic piston 97 which is moved to the right in FIG. 6 by a first hydraulic system. While piston 97 is spring biased to its disengaged position (as shown), return to this disengaged position is assisted by a second hydraulic system, namely, by the lubricating oil flowing through the transmission. A channel 98 permits lubricating fluid to circulate around the right side of piston 97, and the centrifugal forces acting on this lubricating fluid (in response to the rotation of the various transmission elements fixed to crankshaft 11) create a hydraulic force which assists the movement of piston 97 to its disengaged position when the clutch is deactivated.

To prevent any drag in the clutches included in the embodiments shown in FIGS. 1, 2, and 6, when they are disengaged, we prefer leaf spring spacers similar to those suggested in our previous U.S. Pat. No. 2,226,309. FIGS. 3A and 3B show improved leaf spring spacers that do not require any recesses or rivets. Each spacer 80 carries a pair of leaf springs 81 that bear against a neighboring clutch ring and tend to space the clutch rings evenly apart. Each spacer 80 also clips over a clutch ring, as the clutch rings are installed, so that the spacers are trapped within the assembly and cannot escape. The spacer leaves 81 bear against adjacent rings of the same clutch part so that outer ring spacers bear only against outer rings and inner ring spacers bear only against inner rings. This eliminates any relative motion or wear on spring leaves 81. As many leaves as are required can be clipped around each clutch ring so that when hydraulic, pneumatic, or other clutch engaging pressure is released, spacer leaves 81 automatically space the clutch rings evenly apart to eliminate dragging friction between clutch rings. This feature helps maintain the high efficiency of our transmissions.

As indicated earlier, our transmission can be combined with either underdrive or overdrive units. In regard to underdrive, it is possible to use two units of our transmission in tandem to provide a low-low drive for large trucks. Such an underdrive unit 210 is illustrated in FIG. 7, and it is mounted at the output of any of the preferred embodiments of our transmission, such as is indicated schematically in FIG. 5. An input drive coupling 211 receives the splined end of output shaft 58, while the underdrive's output shaft 258 is coupled to the vehicle's drive shaft. The underdrive unit shown in FIG. 7 is quite similar to our orbital transmission 110, except that it does not require, and so omits, the hydraulic drive used in all of our preferred embodiments described above. In all other respects, it is substantially similar; and each of the various components of underdrive 210 are given similar reference numerals to the similar components in the other embodiments, except that these numerals are in a "200" series.

Drive coupling 211 is fixed to a support 214 which carries an orbit shaft 221. A cluster gear 225 is mounted on orbiting shaft 221 and its gear teeth 224 and 223 mesh, respectively, with a control gear 227 and an output gear 226; and orbit drive 220 operates in the same manner as orbit drives 20 and 120 in the embodiments described above.

However, since the hydraulic drive is omitted, this underdrive unit includes no drive gear comparable to gear 13 in the previous embodiments; and instead of hydraulic motor drive gear 51, this unit includes a partition 251 which is bolted to an appropriately positioned bracket 299 formed in the unit's casing 106.

A further synchronous clutch 260 carries out the same function as clutch 160 in FIG. 5. Namely, when sliding collar 291 is moved from its neutral position (as illustrated in FIG. 7) to the right, it initially engages a first blocking ring 293 and, thereafter, a set of gear teeth 294 which are fixed to partition 251 and, therefore, locked against rotation. When shifted into this right hand position, synchronizer hub 292, which is keyed to sleeve 254 and control gear 227, is locked against rotation to the casing. With control gear 227 so locked, rotation of orbit drive 220 causes output gear 226 (keyed to output shaft 258) to rotate at maximum reduction.

When sliding collar 291 is moved from its neutral position, as illustrated, to the left, it initially engages blocking ring 295 and, thereafter, the teeth of pinion 296 which is keyed to output shaft 258. When sliding collar 291 is in this left hand position, synchronous clutch 260 locks control gear 227 and output gear 226 together so that there is no longer any relative motion between them. This prevents any further relative rotation between orbiting cluster gear 225 and output shaft 258 and thus directly couples the rotation of input coupling 211 with output shaft 258.

To facilitate explanation of the operation of underdrive 210, it will be assumed that it is connected to transmission 110 (FIG. 5). When this low-low tandem drive is started up, synchronous clutches 160 and 260 are both shifted to their right hand positions, placing both transmission 110 and overdrive unit 210 in orbit drive. The hydraulic control system for transmission 110 is then operated to continuously reduce the effective gear ratio of transmission 110 until it reaches 1:1, bringing output shaft 58 up to the same speed as crankshaft 11. At this time, output shaft 258 of underdrive 210 is then rotating at a speed equivalent to the lowest speed of transmission 110. When this condition is achieved, underdrive unit 210 is shifted into direct drive (i.e., sliding collar 291 is moved to its left hand position) and, simultaneously, transmission 110 is returned to its lowest speed condition (as indicated in the flow chart in FIG. 4B). Transmission 110 again increases in speed until output shaft 258 of underdrive 210 matches the speed of engine crankshaft 11, at which time clutch 160 is shifted to its left hand position, thus placing both transmission 110 and underdrive unit 210 in direct drive for high speed highway travel.

The transmission drawings referred to above are schematically simplified somewhat to make the illustration more convenient. For instance, in all of the embodiments, hydraulic pump 17 and motor 18 are mounted together in the manner indicated above with hydraulic motor shaft 19 preferably forward of the plane of the cross section. Nevertheless, motor shaft 19 is illustrated below the plane of the cross section to show the geared input to control gears 27 or 47. Similarly, in the drawing of transmission 30 (FIG. 2A), engine shaft 11 is shown behind the plane of the cross section, concealing the connection between gear 31 and gear 32 via an idler gear.

Our transmissions require control systems for engaging and disengaging the clutches and controlling the rate of pump 17. These are generally known and can be accomplished in a variety of ways. For example, the control system can sense engine speed, vehicle speed, accelerator demand, and other engine conditions and make all the necessary adjustments automatically. The transmission can also be shifted manually, which might be preferred on an earth mover, for example, which might work for long periods of time at high torque. An operator lever or knob could control the pump rate and the diminishment of the reduction of the orbital drive to suit operating circumstances. However, for automotive purposes, automatic control is preferable.

Hydraulic operation of the clutches can be accomplished by a separate hydraulic system which is energized by an extra impeller included in variable displacement pump 17. Pumps which include such extra impellers are commercially available and are referred to as "superchargers". In this regard, it should be noted that our design keeps the hydraulic control drive for our transmission separate from the transmission's lubrication system. Therefore, as different from hydraulic automotive transmissions presently in general use, our independent hydraulic systems can each use dissimilar fluids selected for characteristics which are best suited to meet the special requirements of each system.

Also, the hydraulic system can be arranged to bleed pressure from the hydraulic motor whenever the vehicle's brakes are applied. Such an arrangement might be necessary when the vehicle is operated in a "creep" mode. That is, with our transmission, it is possible to move a vehicle at walking speed (for instance, in a parade) by rotating the control gear in a reverse sense, not fast enough to cause the vehicle drive to back up but just fast enough to permit the vehicle to go forward at a very slow speed. However, at such a low speed, the torque developed by our transmission is so high that it may be extremely difficult for the vehicle brakes to stop rotation of the wheels. To remedy this potential problem, hydraulic pressure can be bled from the drive system whenever the vehicle is operating in this creep mode and the vehicle brakes are applied. In this regard, a slight variation of this creep mode can serve as a "hill-holder". That is, whenever the vehicle is stopped on an incline during normal operation (e.g., waiting for a traffic light) and it begins to roll in reverse, the control gear can be rotated very slowly in a reverse direction at a speed which will just balance the vehicle's tendency to roll backward.

Our transmissions can also be used to take full advantage of the braking potential of engine compression in a manner similar to conventional manually-shifted gear transmissions. Such engine braking is particularly valuable for trucks traveling down steep grades. Commercially-available hydraulic pump/motor combinations, such as those contemplated for use in the hydraulic control systems described above, can be equipped with special spool valve interconnections which can be used selectively to reverse the oil flow in the combination. That is, selective operation of the spool valve arrangement permits the motor to drive the pump. By including such known spool valve arrangements in our hydraulic system, they can be used on steep downgrades to have motor 18 drive pump 17 in response to the rotation of output shaft 58 as the vehicle coasts down hill. By adjusting the wobble plate in variable displacement pump 17 (which at such times is acting as a motor), it is possible to increase the speed of rotation of engine crankshaft 11 relative to the speed of output shaft 28 and, thereby, increase the resultant braking effect of the engine's compression.

Although the explanations above relating to our hydraulic pump/motor system have assumed that pump 17 is geared to rotate 1:1. with input shaft 11, it may be commercially preferable to operate pump 17 at higher speeds. For instance, if pump 17 and motor 18 were geared, respectively, to operate at twice the speed of input shaft 11 and control gear 27, it would be possible to halve the size of the hydraulic system, because, at twice the speed, the pump and motor could handle the same horsepower at one-half the torque. Such smaller, but higher speed, hydraulic pump/motor combinations are commercially available (e.g., rated for continuous duty at 12,000 r.p.m.), and such less expensive combinations can also operate effectively with our transmission.

In addition to the possibilities of overdrive and underdrive, as previously mentioned, our transmissions can also include well-known incidentals, such as the speedometer gear 75, parking brake lock 76, and the recess 77 for an electronic speed detector (see FIGS. 1, 2, and 3). Further, although only one orbiting cluster gear is shown for each transmission, it is also possible to have support 14 orbit 2, 3, or 4 identical cluster gears, especially in transmissions 10, 110, and 130, where the orbit path is external to the control and output gears. Such extra cluster gears enable the transmission to bear a larger load. It should be noted that this adjustment of the transmission to handle higher horsepower engines can be accomplished at a very moderate increase in cost and at no increase in the size of the unit itself.

Also, it is possible to modify our orbital drives 20, 120, and 140 so that they may more readily operate at the higher-than-normal r.p.m. rates (e.g., 7000–8000 r.p.m.) being used in certain higher performance engines. Such modification reduces the mass of orbiting support 14 and cluster gear 25 by significantly reducing the size and number of teeth in gears 23 and 24. At the same time, the size and number of teeth of output gear 26 and control gear 27 are increased to substantially maintain the original speed reduction and the original center distance between the two sets of gears. As different from the gears as shown in the drawings, such modified gears 23 and 24 have diameters about one-half the size, or less, than the respective diameters of their mating gears 26 and 27. This smaller version of cluster gear 25 is solid and includes integrated axle portions at each end. As part of this modification, orbit shaft 21 and its needle bearings are replaced by much larger spindle-type bearings mounted on orbiting support 14 to receive the axle ends of modified cluster gear 25. Further, the mass and radius of such a modified orbit drive may be even further reduced by increasing the pitch and reducing the diameter of gears 23, 24, 25, and 26 without changing the numbers of their gear teeth. Referring to the previously mentioned additions of extra cluster gears to bear the larger loads of higher horsepower engines, it should be noted that the just-described reduction in the size of cluster gear 25 permits an increase in the number of cluster gears that can be added to support 14 without increasing the size of our transmission.

In regard to the inclusion of well-known incidentals, reference is also made to the use of damping systems. For instance, in FIG. 5 damper plate 101 is connected to the starter gear through a group of damper springs 102, and another damping arrangement is shown schematically in FIG. 6 in the form of an elastomeric coupling 103 connecting crankshaft 11 with starter gear 12. Such elastomeric couplings are commercially available, e.g., a coupling sold by B. F. Goodrich under the tradename "TORSILASTIC".

The simple orbital gear drive used in our transmissions, in cooperation with our clutch arrangements and direct drive connections, makes our transmissions simpler and more compact than conventional automatic transmissions. Further, transmission 30, being offset from engine shaft 11, can also be lowered relative to engine shaft 11, to afford a low profile and compact transmission. Even with the addition of variable displacement hydraulic pump 17 and hydraulic motor 18, the total cost of our transmissions is no more than the cost of a conventional automatic transmission.

As noted above, we do not incorporate a check valve in our hydraulic control system, and so pressure reduction within our hydraulic system occurs only in response to reduced resistance which results when the vehicle accelerates (in response to applied engine torque) or, on occasions of extreme overload, when the tires spin (because the applied torque exceeds traction). In contrast, hydrostatic pump/motor systems automatically maintain an upper limit on system pressure and so, when the vehicle engine is operating at full power, produce a constant torque output for all output speeds. Therefore, special attention is called to the fact that our transmission does not suffer such inefficiencies, because increases in applied engine horsepower are generally translated by our hydraulic system into increased vehicle motion or momentary wheel spin.

Another feature of our transmission is that the vehicle can be push started or towed, something that is not possible with other automatic transmissions. Also, we have found that a vehicle using our transmission can be rocked back and forth with smooth transitions between these changes in direction. Shifting the drive from forward into reverse and back again does not cause any damage to the transmission since the drive merely slows down, stops, and goes forward as the direction of the control gear is changed.

Of course, a multitude of transmissions can be designed using various combinations of our orbital reduction drive and clutch arrangements described above; output shafts 58 can connect to an overdrive or underdrive, as previously explained; the hydraulic control input can be replaced with an electrical control input; and many variations are possible in housings, supports, gear arrangements, and bearings.

Our orbital transmission gains in efficiency over other automatic transmissions by eliminating the torque converter. Friction losses in our transmission are low, because most of the driving power is transmitted through drive gears. The hydraulic or other input to the control gear of the orbital reduction drive affords a resistance for the other gears to work against and provides some of the higher torque power in a fluid or electromagnetic form. While this is not as efficient as a manually-shifted all gear transmission, it is much more efficient than a torque converter. Further, the hydraulic system of our transmission is not in continuous use. That is, when used in a standard passenger vehicle, our transmission is in direct drive most of the time, with the hydraulic or other control system being inoperative.

Our transmissions also have the advantage of continuously varying torque/speed ratios throughout a range from low gear to direct drive. This continuous variability combined with significantly improved efficiency, including direct drive under lower torque/higher speed conditions, are the main advantages of our transmissions.

We claim:

1. An orbital transmission drive comprising:
   a. an output gear mounted on an output shaft;
   b. a control gear mounted coaxially with said output gear;
   c. an orbit shaft parallel with said output shaft and mounted for orbiting around the axis of said output shaft in response to an input drive;
   d. a cluster gear mounted on said orbit shaft and meshed with said output gear and said control gear;
   e. gear tooth ratios between said cluster gear and said control and output gears being arranged so that said input drive orbiting said cluster gear around said control and output gears produces a reduced rotation of said output shaft;
   f. said control gear being arranged relative to said output gear and said cluster gear so that holding said control gear against rotation produces a reduction of said input drive, rotating said control gear in one direction diminishes said reduction of said input drive, and rotating said control gear in an opposite direction produces reverse rotation of said output shaft;
   g. a control drive for rotating said control gear;
   h. a first clutch for selectively connecting said control drive and said control gear; and
   i. a second clutch for selectively connecting said input drive directly to said output shaft.

2. The orbital transmission drive of claim 1 wherein said clutches are formed of arrays of internal and external rings, each of which bears a spring spacer clip that urges said rings apart, when said clutches are disengaged.

3. An orbital transmission comprising:
   an orbital reduction drive including an output gear on an output shaft, a control gear mounted coaxially with said output gear, a cluster gear having different sets of gear teeth which mesh respectively with said output gear and said control gear, aid cluster gear being mounted on an orbit shaft parallel with said output shaft and arranged for orbiting around the axis of said output shaft in response to a drive input;
   b. gear tooth ratios between said respective sets of cluster gear teeth and said control and output gears being arranged so that said drive input orbiting said cluster gear produces a reduced rotation of said output gear, providing a low gear drive wherein said output shaft turns at a lower speed than said drive input;
   c. a control input being applied to said control gear for holding said control gear against rotation for said low gear drive, rotating said control gear in one direction to diminish the reduction of said drive input as the speed of said drive input increases, and for rotating said control gear in an opposite direction to reverse said output gear; and d. a clutch arrangement directing said control input to said control gear providing said low gear drive, and directing said drive input to said output shaft to provide a direct drive bypassing said orbital drive.

4. The orbital transmission of claim 3 wherein said clutch arrangement has:
   a first condition in which it engages said control gear and said control input,
   a second condition in which it disengages said control gear and said control input and engages said drive input and said output shaft, and
   a neutral condition in which it remains disengaged from both its first and second conditions.

5. The orbital transmission of claim 3 wherein said clutch arrangement comprises a synchronous clutch fixed for rotation with said control gear and having:
   a first engaged position interlocking said control gear and said control input,
   a second engaged position interlocking said control gear and aid output gear, and
   a neutral position disengaged from both said control input and said output gear.

6. The orbital transmission of claim 3 wherein the connection between said drive input and said orbital reduction drive includes vibration dampening means.

7. The orbital transmission of claim 6 wherein said dampening means include an elastomer.

8. The orbital transmission of claim 3 wherein said control input to said control gear is made via a variable displacement hydraulic pump driving a hydraulic motor.

9. The orbital transmission of claim 8 wherein said pump operating at full displacement turns said motor and said control gear at a speed that substantially matches the speed of said output shaft with the speed of said drive input, allowing said clutch arrangement to be shifted from said first condition to said second condition.

10. The orbital transmission of claim 9 wherein said pump runs at the speed of said drive input.

11. The orbital transmission of claim 9 wherein said pump runs faster than the speed of said drive input.

12. The orbital transmission of claim 11 wherein said pump runs at twice the speed of said drive input.

13. The orbital transmission of claim 8 wherein said pump operating at full displacement turns said motor at a speed faster than the speed of said drive input, and wherein said motor turns said control gear at a speed that substantially matches the speed of said output shaft with the speed of said drive input.

14. The orbital transmission of claim 13 wherein said pump runs at twice the speed of said drive input.

15. An automatic transmission comprising:
   a. a direct drive connectable between an engine drive and an output and an orbital drive connectable between said engine drive and said output, said orbital drive varying a reduction of said engine drive throughout a continuum from a lowest gear ratio up to said direct drive;
   b. said orbital drive having gearing including only (i) a control gear, (ii) an output gear, and (iii) a cluster gear in mesh with both said control gear and said output gear, and said orbital drive being arranged so that said engine drive orbits said cluster gear relative to said control and output gears;
   c. said orbital drive, control gear, and output gear all being arranged on a common axis; and
   d. said engine drive being arranged for rotating a variable displacement hydraulic pump driving a hydraulic motor controlling said control gear of said orbital drive so that holding said control gear against rotation reduces said engine drive to said lowest gear ratio, rotating said control gear in a first direction diminishes said reduction of said engine drive as a function of the speed of said control gear, and rotating said control gear in the opposite direction reverses the direction of said output.

16. The automatic transmission of claim 15 wherein said drive and control gears are external gears, and said cluster gear is mounted on an orbital shaft for orbiting around the outsides of said drive and control gears, and said engine drive is arranged on said common axis.

17. The automatic transmission of claim 15 wherein said drive and control gears are ring gears, and said cluster gear is mounted on an orbit shaft for orbiting around the insides of said drive and control gears.

18. The automatic transmission of claim 15 wherein said said cluster gear comprises first and second orbital gears fixed to rotate together and meshing respectively with said control and output gears, said first and second orbital gears having diameters less than one-half the diameters of their respective meshing control and output gears.

19. A continuously variable transmission for interconnecting an engine crankshaft with an output drive shaft comprising:
   a. an orbital drive having a support fixed for rotation with said crankshaft and carrying a first orbital gear and a second orbital gear fixed together and rotational about a common axis parallel to the axis of said crankshaft, said orbital gears having different numbers of teeth;
   b. a control gear in mesh with said first orbital gear;
   c. an output gear rotatable with said drive shaft and in mesh with said second orbital gear;
   d. a control input for rotating said control gear to vary the rotation of said output drive shaft relative to the rotation of said crankshaft;
   e. a clutch arrangement for selectively disconnecting said control input and for selectively connecting said drive shaft directly with said crankshaft;
   and said transmission further comprising:
   f. a second output gear mounted on a second output drive shaft;
   g. a second control gear mounted coaxially with said second output gear;
   h. a second orbit shaft parallel with said second output drive shaft and mounted for orbiting around the axis of said second output drive shaft in response to the rotation of said first output drive shaft;
   i. a second cluster gear mounted on said second orbit shaft and meshed with said second output gear and said second control gear;
   j. gear tooth ratios between said second cluster gear and said second control and output gears being arranged so that rotation of said first output drive shaft orbiting said cluster gear around said second control and output gears produces a reduced rotation of said second output drive shaft;
   k. said second control gear being arranged relative to said second output gear and said second cluster gear so that holding said second control gear against rotation produces a reduction of said first output drive;

l. a locked gear fixed against rotation; and m. a second clutch arrangement for selectively connecting said locked gear and said second control gear, and for selectively connecting said first output drive shaft directly to said second output drive shaft.

20. A method of automatically transmitting an engine drive to a vehicle drive, said method comprising:

a. engaging said engine drive with said vehicle drive for a direct drive to operate said vehicle;

b. engaging said engine drive with an orbital drive having gearing for reducing the speed of said vehicle drive relative to said engine drive;

c. arranging said gearing of said orbital drive to include only (i) a control gear, (ii) an output gear, and (iii) a cluster gear; said cluster gear to mesh with and to orbit relative to said control and output gears; and said cluster gear to be carried by a support rotated by said engine drive; and further arranging said support and said control gear and said output gear on a common axis;

d. providing a control input for varying the rotation of said control gear of said orbital drive so that holding said control gear against rotation provides maximum reduction of said engine drive, rotating said control gear in a forward direction diminishes said reduction of said engine drive, and rotating said control gear in a reverse direction reverses said vehicle drive; and .

e. arranging said control input to operate synchronously in phase with said engine drive so that the speed of rotation of said control gear is continuously variable from zero speed, providing said maximum reduction of the engine drive, through a speed in which said orbital drive operates said vehicle drive at a speed equal to said engine drive.

21. The method of claim 20 including arranging said engine drive on said common axis.

22. The method of claim 20 including hydraulically controlling rotation of said control gear.

23. The method of claim 22 including arranging a clutch for engaging a hydraulic drive with said control gear.

24. The method of claim 20 including bypassing said orbital drive by using a clutch for engaging said engine drive with said output shaft for said direct drive.

25. The method of claim 20 wherein, when said control input is operated at full speed, said control gear matches said vehicle drive with said engine drive to allow shifting between said direct drive and said orbital drive.

26. The method of claim 20 wherein said step of providing a control input includes driving a variable displacement hydraulic pump with said engine drive and driving a hydraulic motor with fluid from said pump to control the control gear.

27. The method of claim 20 further comprising, selectively actuating a direct drive clutch to engage said engine drive with said vehicle drive, and selectively actuating an orbital drive clutch to engage said control input with said control gear.

28. The method of claim 27 wherein said direct drive clutch and said orbital drive clutch comprise a single synchronous clutch movable from a neutral position to a high range position engaging said engine drive and vehicle drives, and (b) a low range position engaging said control input with said control gear.

29. The method of claim 22 including driving said hydraulic motor and said control gear at continuously variable speeds that continuously vary the reduction of said engine drive throughout a range from said maximum reduction to a speed equivalent to said engine drive.

* * * * *